United States Patent [19]
Placide et al.

[11] Patent Number: 6,045,292
[45] Date of Patent: Apr. 4, 2000

[54] FITTING FOR MOUNTING A WINCH ON THE STRUCTURE OF AN AIRCRAFT SUCH AS A HELICOPTER

[75] Inventors: Patrice Robert Paul Placide, Aix en Provence; Gérard Hector Raymond Couderc, Vitrolles, both of France

[73] Assignee: Eurocopter, Marignane Cedex, France

[21] Appl. No.: 08/873,232

[22] Filed: Jun. 11, 1997

[30] Foreign Application Priority Data

Jun. 13, 1996 [FR] France .................................. 96 07357

[51] Int. Cl.⁷ .................................................. B25G 3/28
[52] U.S. Cl. .................................. 403/359.3; 403/359.6; 403/349; 403/103
[58] Field of Search ................... 403/359.1, 359.3, 403/359.6–349, 97, 103; 248/292.12; 244/137.1

[56] References Cited

U.S. PATENT DOCUMENTS

| | | |
|---|---|---|
| 2,921,773 | 1/1960 | Hoelzer .............................. 403/103 X |
| 4,327,821 | 5/1982 | Telford . |
| 4,929,113 | 5/1990 | Sheu ...................................... 403/84 X |
| 5,186,197 | 2/1993 | Lavine .............................. 403/349 X |
| 5,265,969 | 11/1993 | Chuang .............................. 403/103 X |
| 5,520,272 | 5/1996 | Ewer et al. . |
| 5,581,838 | 12/1996 | Rocco .................................. 403/97 X |

FOREIGN PATENT DOCUMENTS

| | | |
|---|---|---|
| 44 10 749 | 4/1995 | Germany . |
| 2113 794 | 8/1983 | United Kingdom . |

*Primary Examiner*—Lynne H. Browne
*Assistant Examiner*—David E. Bochna
*Attorney, Agent, or Firm*—Henderson & Sturm LLP

[57] ABSTRACT

A fitting for mounting a winch includes an axially sliding ring between an internally splined bearing and a splined shaft. Utilizing internal splines, the ring is constantly engaged with the external splines of the shaft. Axial sliding of the ring, facilitated by a pivoting grip, permits coupling and uncoupling of the interrupted internal splines of the bearing and the interrupted external splines of the ring. This coupling and uncoupling makes it possible to lock and unlock the shaft with respect to rotation.

19 Claims, 5 Drawing Sheets

FITTING FOR MOUNTING A WINCH ON THE STRUCTURE OF AN AIRCRAFT SUCH AS A HELICOPTER

BACKGROUND OF THE INVENTION

1. Field of the Invention

The present invention relates to a fitting for mounting a winch on the structure of an aircraft such as a helicopter, this winch being attached to one end, distant from the said structure, of a mobile jib whose other end is articulated with the said structure about a geometrically horizontal axis.

2. Description of the Prior Art

A known fitting of this type is shown diagrammatically in FIGS. 1a and 1b of the accompanying drawing.

In these figures the reference 20 indicates a conventional winch, intended for example for the rescue of persons in danger in places of difficult access. High in the mountains, helicopters with winching installations are used for the rescue of climbers trapped in avalanches or on rocky edges. In air-sea rescue these same devices are used to rescue shipwrecked persons when the state of the sea does not allow an approach by boat.

This winch is attached to the distal end of a mobile jib 21 whose other end is articulated with the structure or cabin 22 of a helicopter about a geometrically horizontal axis 23. The jib 21 is also connected to the structure 22 of the aircraft by a support rod 24. The reference 25 indicates an engine cowl, mounted in an articulated manner on the upper part of the structure 22.

In the normal position of use shown in FIG. 1a, the engine cowl 25 is closed, the jib 21 is in the raised position and the winch 20 is in the normal winching position, separated from the cabin 22. The jib 21 is maintained in this practically horizontal position by the support rod 24, the bottom end of which is pinned to a fixed mount 26 on the cabin 22.

In the maintenance position shown in FIG. 1b, the engine cowl 25 is open and can be used as gangway allowing the mechanic to walk on the top in order to carry out maintenance operations. In the position shown in FIG. 1a, the opening of the engine cowl 25 would be impeded by the presence of the winch 20. That is why it is appropriate to lower the winch, in order to bring it into the position shown in FIG. 1b, in which it is no longer operational, it being too close to the cabin 22 (that is why it cannot remain in this position permanently). In order to pivot the jib 21 downwards about its axis 23 and to bring the winch 20 into the position shown in FIG. 1b, it is convenient to unpin the bottom end of the support rod 24, to hold it in the hand and make it continue its support and then to re-pin it to the fixed mount by the intermediary of a strut 27 of the support rod. These operations require two operators and are difficult insofar as there is always a risk of losing the pin (not shown) which connects the mount 26 to the bottom end of the support rod 24 or to the strut 27. There is also a risk of one of the operators releasing the support rod 24, which can damage the aircraft.

The presence of the support rod 24 also gives rise to the disadvantage that it obstructs a portion of the access door 28 of the cabin 22, which makes it difficult for people to enter the aircraft. It also presents a jamming point for winched persons who can grab this rod in a state of panic and no longer wish to release it, thus impeding their rescue.

BRIEF SUMMARY OF THE INVENTION

The purpose of the present invention is to overcome all of these disadvantages and to propose a new fitting making it possible to eliminate the support rod 24.

For this purpose, a fitting of the type mentioned at the beginning, according to the present invention, characterized in that the said other end of the jib is provided with horizontal shaft ends which are rigidly integral with it and which are respectively mounted in two bearings of the structure, one of the bearings receiving the corresponding shaft end in a freely rotative manner and the other bearing being provided with an unlockable device for locking the other shaft end, with respect to rotation, by means of which the said shaft ends and the jib with which they are integral can occupy two positions, namely a locked position in which the jib is raised and holds the said winch separated from the said structure, in the normal winching position, and an unlocked position in which the said jib is lowered and brings the winch into a position close to the said structure and allowing the maintenance of the said aircraft.

The invention also relates to the particular embodiment of the unlockable locking device which has just been mentioned.

An additional purpose of the invention is to obtain a simple device which can be operated rapidly by hand or mechanically, by a single operator, and which also has high reliability and is particularly applicable to helicopter winches as will be seen below.

Such a device is principally characterized, for this purpose, in that it comprises two assemblies of mutually cooperating splines, namely a first assembly comprising, on the said shaft, a set of first straight external splines and, on the said ring, a set of second straight internal splines, and a second assembly comprising, on the said bearing, a set of third straight internal splines and, on the said ring, a set of fourth straight external splines, and in that the said ring is coupled with means of axial displacement between two positions:

a locked position in which the splines of the said first assembly are meshed with one another, as are the splines of the said second assembly; and an unlocked position in which the splines of at least one of the said assemblies are mutually disengaged.

In order to obtain the possibility of unlocking between at least certain of the cooperating splines, it will be furthermore possible to provide, in at least one of the said assemblies, for at least one of the sets of cooperating splines to have a peripheral gap which can allow the passage of the other set of splines of the assembly in question.

It will be seen better below how these gaps make it possible, by an axial sliding of the ring, to obtain locking or unlocking between the intermediate shaft and its bearing.

According to a possible variant, the first and second splines of the said first assembly are permanently mutually engaged, the splines which can be mutually disengaged being the third and fourth splines of the said second assembly, namely the internal splines of the said bearing and the external splines of the said ring.

It is understood that it would however be possible to use a reverse device, starting from a permanent engagement between the third and fourth splines of the second assembly.

Advantageously, the said peripheral gap is provided in a substantially median manner in the sets of splines in question, over a length slightly greater than that of the sections of splines extending on either side of these gaps.

Thus, unlocking can be obtained by the axial sliding of the intermediate ring in one direction or in the other direction, starting from its median locking position.

As regards the means of axial displacement of the ring, they can comprise a pivoting grip mounted on the said ring, locked axially and provided with at least one helical slot, each slot being traversed by a pin fixed to the said ring.

BRIEF DESCRIPTION OF THE SEVERAL VIEWS OF THE DRAWINGS

An embodiment of a device according to the present invention will now be described as an example which is in no way limitative and with reference to the other figures of the accompanying drawing in which.

DETAILED DESCRIPTION OF THE INVENTION

Figure 1A:
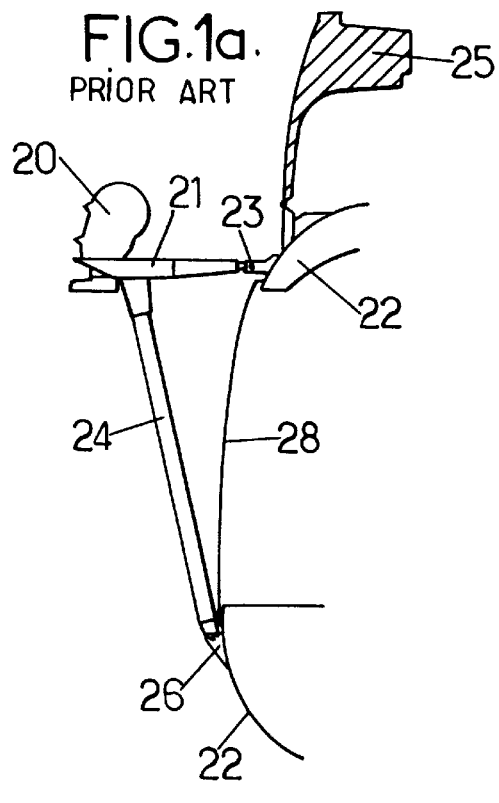
Figure 1B:
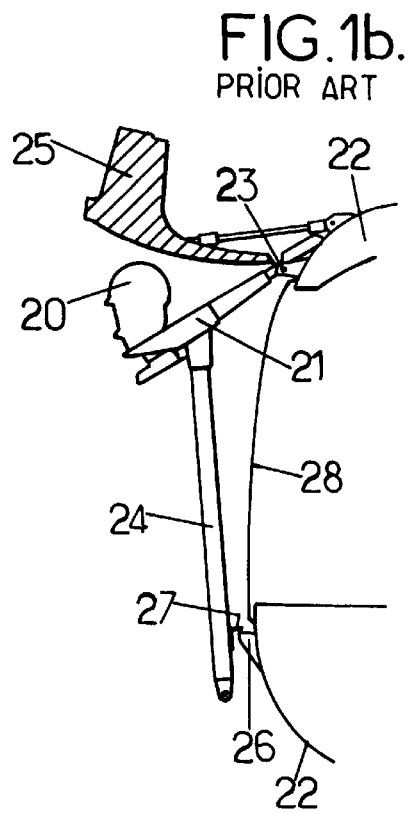
Figure 2A:
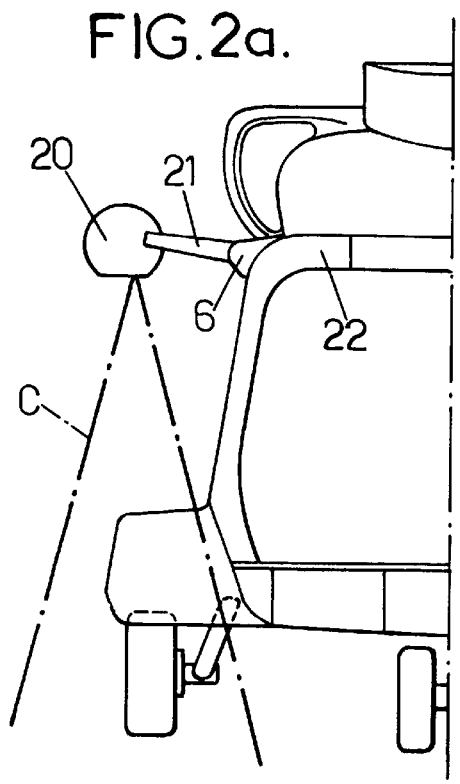
FIG. 2a is a partial diagrammatic profile view of a helicopter cabin equipped with a winch-mounting fitting according to the invention, the winch being locked in its raised winching position.
Figure 2B:
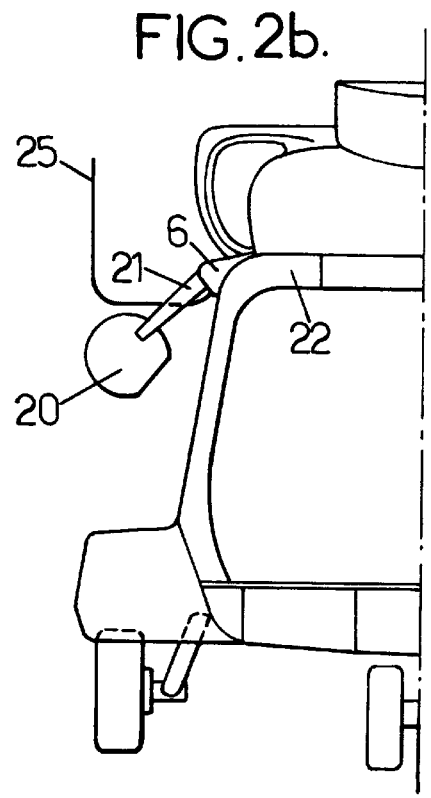
FIG. 2b is a view of the same type showing the winch in a lowered position allowing the opening of the engine cowl and therefore the maintenance operations on the aircraft.

In FIGS. 2a and 2b, the reference 20 again indicates the winch mounted on its mobile jib 21, which is itself mounted in a pivoting and lockable manner on the structure 22 of the helicopter by the intermediary of two bearings 6 and 6' (FIG. 3), only the bearing 6 being visible in FIGS. 2a and 2b. In FIG. 2a it can be seen that the winch 20 is sufficiently distant from the cabin 22 for it to be operational in the winching cone C. On the other hand it is no longer in the lowered maintenance position of FIG. 2b, in which however it is permissible to open the engine cowl 25, serving as a gangway for the mechanic.

Figure 3:
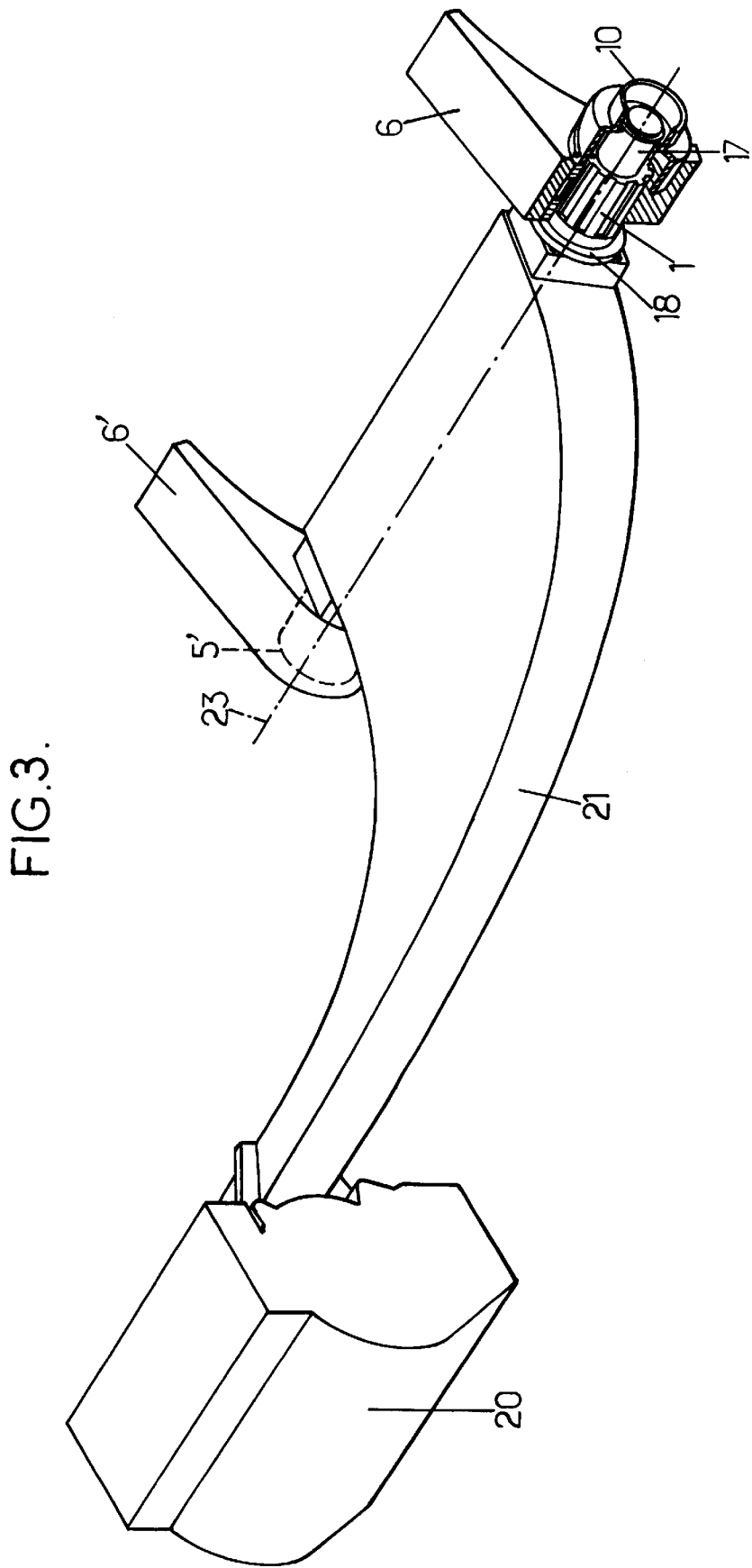
FIG. 3 is a perspective view with parts torn away showing the jib of the winch in the raised position, with its unlockable locking device in one of the bearings of the structure.

In FIG. 3, the raised position of the jib 21 corresponds to the one shown in FIG. 2a. The jib 21 carries, along the pivoting axis 21, two shaft ends: one of them, 5' is mounted in a freely rotative manner in a bearing 6' fixed to the structure 22 of the aircraft and the other, referenced 5 (see FIGS. 4 and the following ones) being mounted in a rotative manner in a bearing 6 but which can be manually locked there by means of the unlockable locking device which will now be described.

Figure 4:
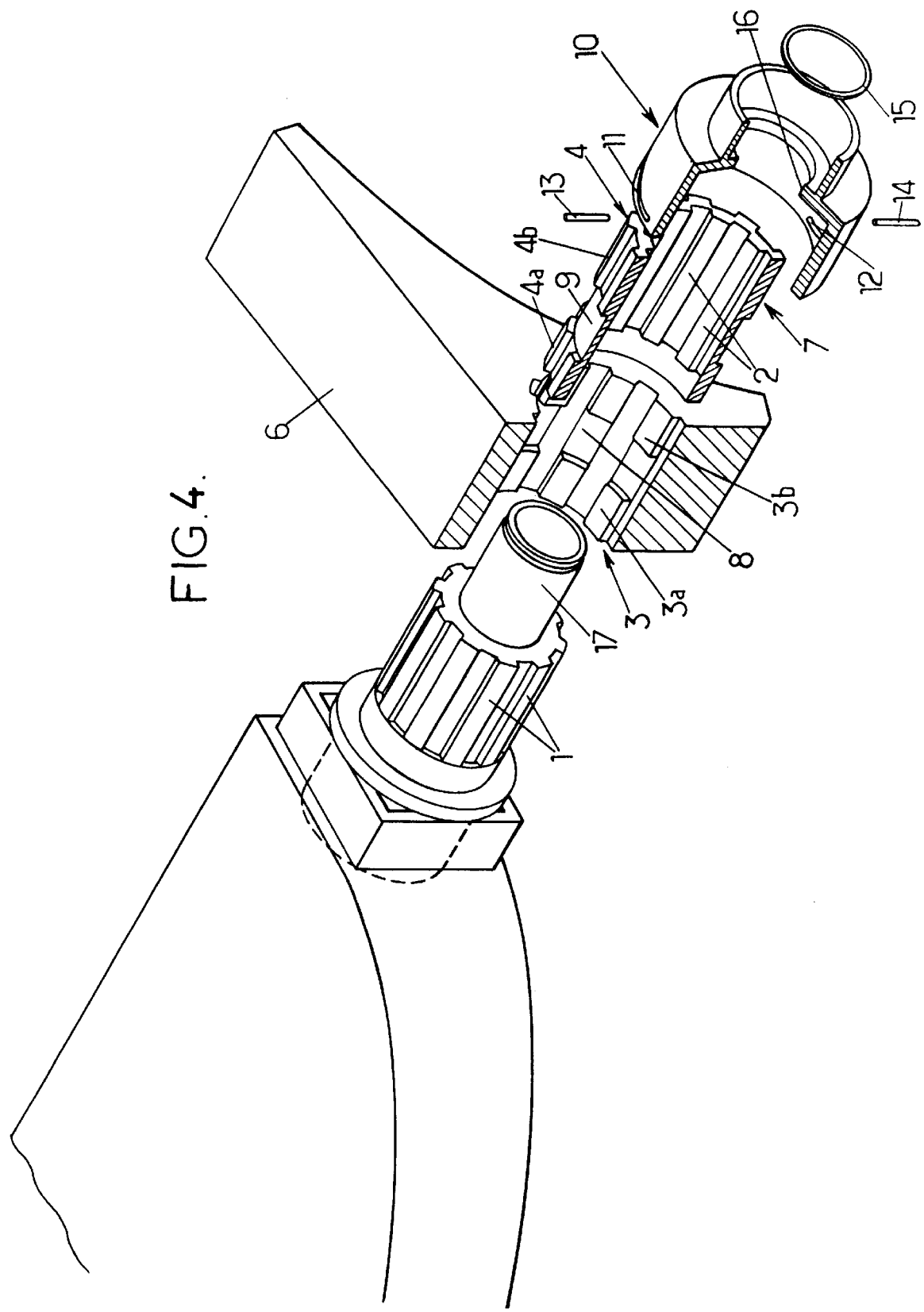
FIG. 4 is a perspective exploded view of a device according to the invention, in the dismantled state.
Figure 5:
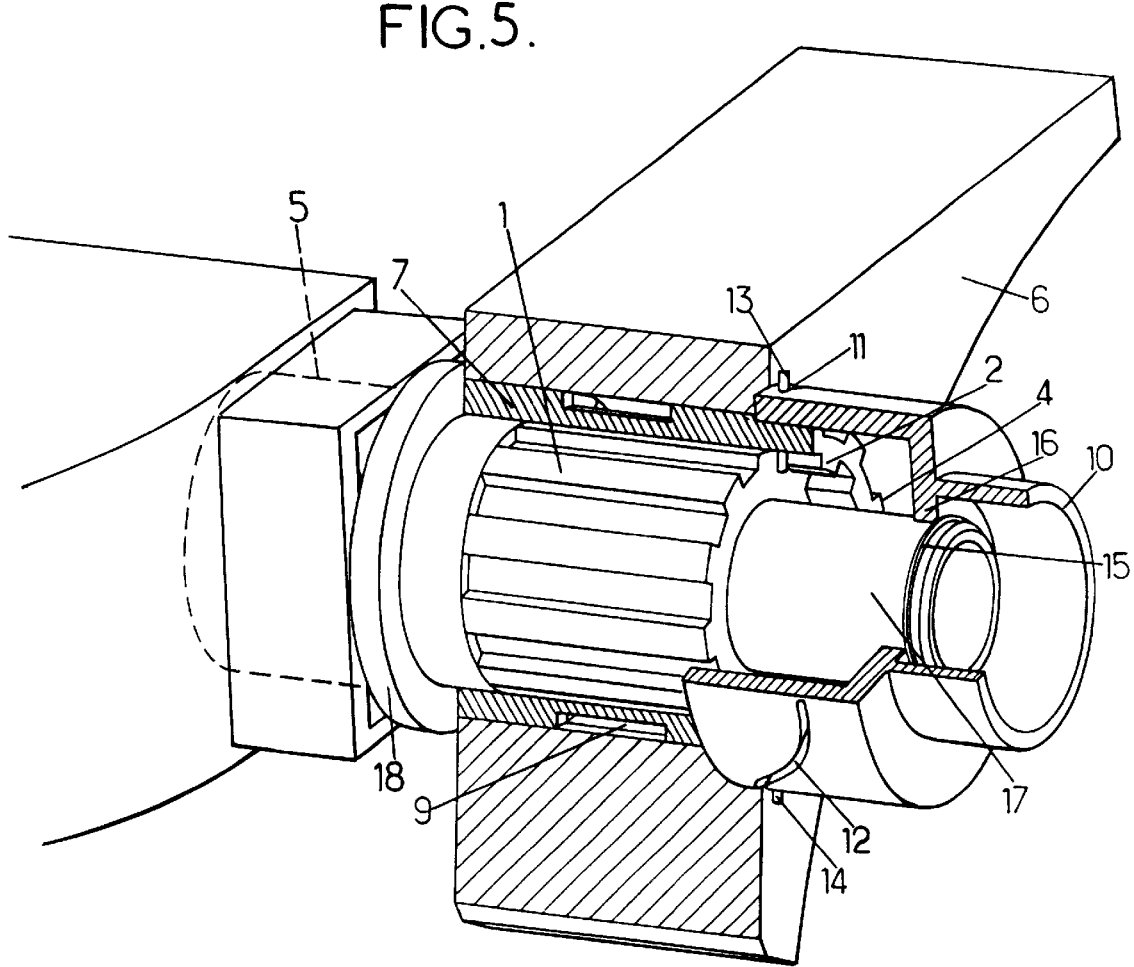
FIG. 5 is a perspective exploded view of the assembled device in the position of locking the shaft.
Figure 6:
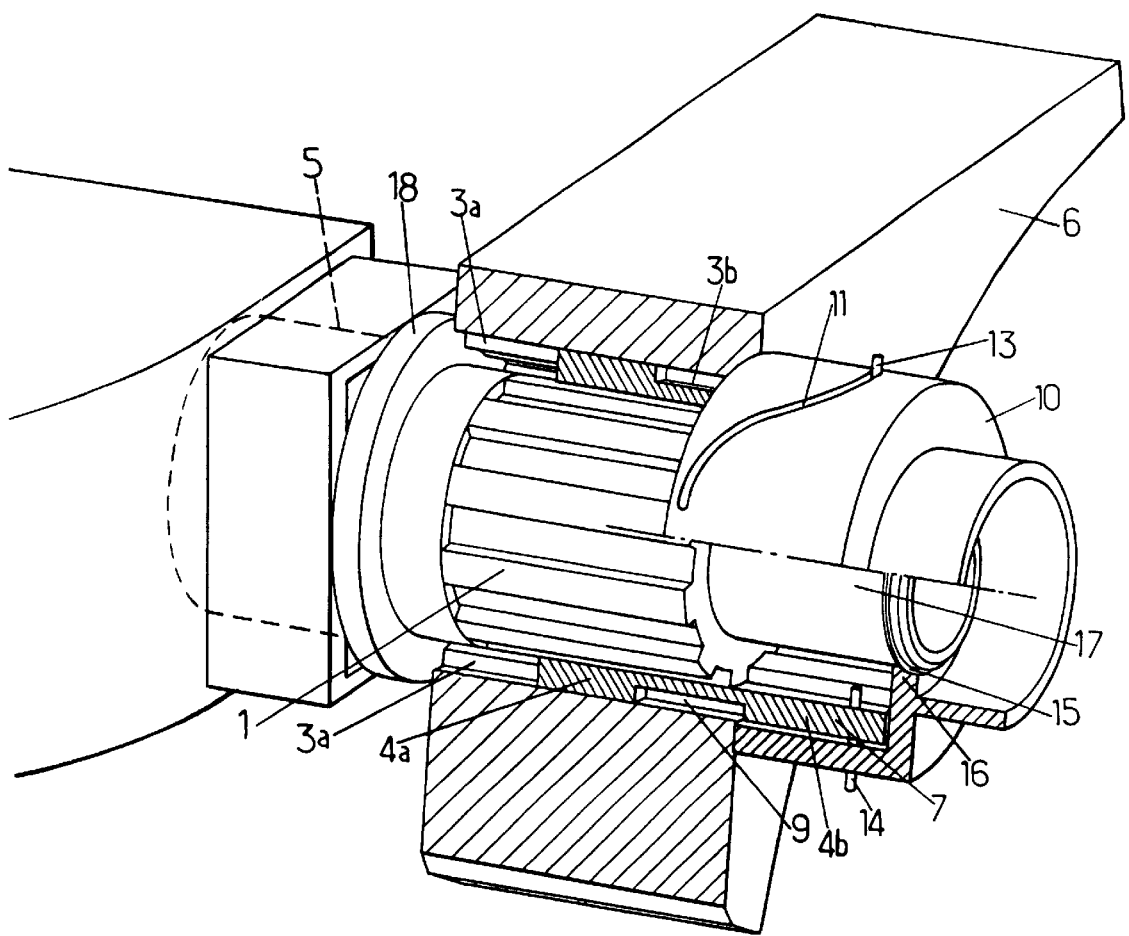
FIG. 6 is a view similar to the preceding one but in the unlocked position.

In FIGS. 4 to 6, the reference 1 indicates a set of first straight external splines distributed around the end of shaft 5 for which it is convenient to be able to command, manually, locking or unlocking, in rotation, with respect to a bearing 6, this being possible by means of an intermediate ring 7. For this purpose, this ring internally comprises a set of second straight internal splines 2 which between them form grooves suitable for receiving the splines 1 of the end 5 after assembly. The splines 1 and 2 constitute what is referred to above as the "first assembly".

The bearing 6 comprises a set of third straight internal splines 3, and the ring 7 comprises a set of fourth straight external splines 4 constituting with the preceding ones what is referred to above as "the second assembly".

All of the splines are angularly equidistributed and their width dimensions are such that they together constitute grooves for receiving cooperating splines; in order not to clutter the drawing, only the splines have been referenced.

The splines 3 of the bearing 6 have, centrally and substantially over ⅓ of their length, a peripheral gap 8, thus dividing these splines into sections 3a, 3b of equal length. The disposition is the same for the external splines 4 of the ring 7: they are divided into sections 4a, 4b by a central peripheral gap 9 extending over ⅓ of their total length. In this way, the ring 7 can be locked with respect to rotation in the bearing 6 when the sections of splines 3a and 3b are respectively meshed with the sections of splines 4a and 4b, the end 5, constantly locked in rotation with respect to the ring 7 by the meshing of the splines 1 and 2, is therefore locked in rotation with respect to the bearing 6, this being the locked situation of the shaft shown in FIG. 5.

On the contrary, if the ring 7 is axially slid in one direction or the other, sufficiently for its sections of splines 4a and 4b to come into alignment with the peripheral gap 8 in the splines 3 of the bearing 6, then the ring 7 and therefore the end 5 will be able to rotate in the bearing 6; such an unlocked situation is shown in FIG. 6, wherein the sections 4a can move in the peripheral gap 8 of the splines 3, whilst the sections 3b are in alignment with the gap 9 of the splines 4.

It will be possible for the axial displacements of the ring 7, in one direction or the other, to be controlled by any appropriate means, for example by means of a pivoting grip 10 mounted on the ring 7. This grip is locked axially on the one hand by bearing against the side of the bearing 6 and on the other hand by butting with a shoulder 16 against a circlip 15 engaged in a peripheral groove of a shaft end 17; the end 5 bears with a shoulder 18 against the opposite side of the bearing 6.

Two opposite helical slots 11, 12 in the grip 10 are respectively traversed by pins 13, 14 engaged in corresponding radial housings in the ring 7. Thus, when the grip 10 is rotated in the clockwise direction, the ring 7 enters into the bearing 6 (locking of the end 5 in the bearing 6), and it moves out of it if the grip 10 is rotated in the opposite direction (unlocking of the shaft end 5). This rotation can be carried out by hand or by means of a motor.

The applications of the present invention can be multiplied and can be advantageous in cases where it is necessary to be able to lock or unlock a shaft with respect to a fixed structure.

As it follows and already results from the above, the invention can be embodied in a large number of variants, and in particular the ⅓ ratio is given above only by way of example. The essential operational condition of the device is only that the length of the sections of splines 4a is less than the distance between the sections of splines 3a and 3b, and that the length of the sections of splines 3b is less than the distance between the sections of splines 4a and 4b.

In order to increase the mechanical strength of the device, the bearing 6 and the ring 7 could each comprise at least two recesses between their respective splines according to requirements.

What is claimed is:

1. A fitting for mounting a winch on a structure of a helicopter, wherein said winch is adapted to be moved between a rest position close to said structure and a working position distant from said structure, said winch being adapted to be attached to one end, distant from said structure, of a mobile jib comprising another end adapted to be articulated on said structure about a geometrically horizontal axis and is provided with two horizontal shaft ends adapted to be respectively mounted in two corresponding bearings of said structure, wherein one of said bearings is arranged to receive one of said horizontal shaft ends in a freely rotating manner and the other bearing is provided with an unlockable device adapted to lock the other horizontal shaft end with respect to rotation, by means of which said horizontal shaft ends and said mobile jib are adapted to occupy two positions, comprising a locked position in which said mobile jib is adapted to be raised and to hold said winch separated from said structure in said working position, and an unlocked position in which said mobile jib is adapted to be lowered and to bring said winch into said rest position close to said structure to allow the maintenance of said helicopter, wherein the unlockable device adapted to lock the other horizontal shaft end comprises an intermediate ring engaged between said other horizontal shaft end and said other bearing, and a plurality of assemblies of mutually cooperating splines, comprising a first assembly comprising, on said other horizontal shaft end, a set of straight external splines and, on said ring, a set of straight internal splines, and a second assembly comprising, on said other bearing, a set of straight internal splines and, on the said ring, a set of straight external splines, and wherein said ring is coupled with means of axial displacement between a plurality of positions comprising:

a locked position in which the said set of straight external splines on said other horizontal shaft end and said set of straight internal splines on said ring of said first assembly are meshed with one another, and said set of straight internal splines on said other bearing and said set of straight external splines on said ring of said second assembly are meshed with one another; and an unlocked position in which in at least one of said plurality of assemblies, said set of splines are mutually disengaged.

2. The fitting according to claim 1 wherein said set of straight external splines on said other horizontal shaft end and said set of straight internal splines on said ring of said first assembly are permanently mutually engaged, and wherein said set of straight internal splines on said other bearing and said set of straight external splines on said ring of said second assembly are capable of being mutually disengaged.

3. The fitting according to claim 2, wherein said means of axial displacement of said ring comprises a pivoting grip mounted on said ring, locked axially and provided with at least one helical slot, each of said at least one helical slot being traversed by a pin fixed to said ring.

4. The fitting according to claim 2, wherein said means of axial displacement of said ring comprises a pivoting grip mounted on said ring, locked axially and provided with at least one helical slot, each of said at least one helical slot being traversed by a pin fixed to said ring.

5. The fitting according to claim 2, wherein for at least one of said plurality of assemblies, said set of splines includes a peripheral gap for allowing passage of another of said set of splines.

6. The fitting according to claim 3 wherein said set of straight external splines on said other horizontal shaft end and said set of straight internal splines on said ring of said first assembly are permanently mutually engaged, and wherein said set of straight internal splines on said other bearing and said set of straight external splines on said ring of said second assembly are capable of being mutually disengaged.

7. The fitting according to claim 6, wherein said means of axial displacement of said ring comprises a pivoting grip mounted on said ring, locked axially and provided with at least one helical slot, each of said at least one helical slot being traversed by a pin fixed to said ring.

8. The fitting according to claim 7 wherein said peripheral gap is provided in a substantially median manner in said set of straight internal splines on said other bearing and said set of straight external splines on said ring, over a length slightly greater than a length of sections of splines extending on either side of each said peripheral gap.

9. The fitting according to claim 3 wherein said peripheral gap is provided in a substantially median manner in said set of straight internal splines on said other bearing and said set of straight external splines on said ring over a length slightly greater than a length of sections of splines extending on either side of each said peripheral gap.

10. The fitting according to claim 5, wherein said means of axial displacement of said ring comprises a pivoting grip mounted on said ring, locked axially and provided with at least one helical slot, each of said at least one helical slot being traversed by a pin fixed to said ring.

11. The fitting according to claim 4 wherein said peripheral gap is provided in a substantially median manner in said set of straight internal splines on said other bearing and said set of straight external splines on said ring, over a length slightly greater than a length of sections of splines extending on either side of each said peripheral gap.

12. The fitting according to claim 8, wherein said means of axial displacement of said ring comprises a pivoting grip mounted on said ring, locked axially and provided with at least one helical slot, each of said at least one helical slot being traversed by a pin fixed to said ring.

13. The fitting according to claim 3, wherein said means of axial displacement of said ring comprises a pivoting grip mounted on said ring, locked axially and provided with at least one helical slot, each of said at least one helical slot being traversed by a pin fixed to said ring.

14. An apparatus for mounting a winch on a structure of an helicopter, said apparatus comprising a mobile jib, two bearing mounted on said structure of said helicopter, and a fitting for connecting said mobile jib to said two bearings, wherein said winch is adapted to be moved between a rest position close to said structure and a working position distant from said structure, said winch being adapted to be attached to one end, distant from said structure, of said mobile jib, said mobile jig comprising another end adapted to be articulated on said structure about a geometrically horizontal axis and including two horizontal shaft ends adapted to be respectively and correspondingly mounted in said two bearings, wherein one of said bearings is arranged to receive one of said horizontal shaft ends in a freely rotating manner and the other bearing is provided with an unlockable device adapted to lock the other horizontal shaft end, with respect to rotation, by means of which said horizontal shaft ends and said mobile jib are adapted to occupy two positions, comprising a locked position in which said mobile jib is adapted to be raised and to hold said winch separated from said structure, in the normal winching in said working position, and an unlocked position in which said mobile jib is adapted to be lowered and to bring said winch into said rest position close to said structure.

15. The apparatus according to claim 14, wherein the unlockable device adapted to lock the other horizontal shaft end comprises an intermediate ring engaged between said other horizontal shaft end and said other bearing, and a plurality of assemblies of mutually cooperating splines, comprising a first assembly comprising, on said other horizontal shaft end, a set of straight external splines and, on said ring, a set of straight internal splines, and a second assembly comprising, on said other bearing, a set of straight internal splines and, on the said ring, a set of straight external splines, and wherein said ring is coupled with means of axial displacement between a plurality of positions comprising:

a locked position in which the said set of straight external splines on said other horizontal shaft end and said set of straight internal splines on said ring of said first assembly are meshed with one another, and said set of straight internal splines on said other bearing and said set of straight external splines on said ring of said second assembly are meshed with one another; and an unlocked position in which in at least one of said plurality of assemblies, said set of splines are mutually disengaged.

16. The apparatus according to claim 15 wherein said set of straight external splines on said other horizontal shaft end and said set of straight internal splines on said ring of said first assembly are permanently mutually engaged, and wherein said set of straight internal splines on said other bearing and said set of straight external splines on said ring of said second assembly are capable of being mutually disengaged.

17. The apparatus according to claim 15, wherein said means of axial displacement of said ring comprises a pivoting grip mounted on said ring, locked axially and provided with at least one helical slot, each of said at least one helical slot being traversed by a pin fixed to said ring.

18. The apparatus according to claim 15, wherein for at least one of said plurality of assemblies, said set of splines includes a peripheral gap for allowing passage of another set of splines.

19. The apparatus according to claim 18 wherein said peripheral gap is provided in a substantially median manner in said set of straight internal splines on said other bearing and said set of straight external splines on said ring, over a length slightly greater than a length of sections of splines extending on either side of each said peripheral gap.

* * * * *